May 23, 1961  R. H. SCHULZ  2,985,287
RUPTURABLE PACKAGES AND COMPONENTS THEREOF
Filed Feb. 14, 1958  2 Sheets-Sheet 1
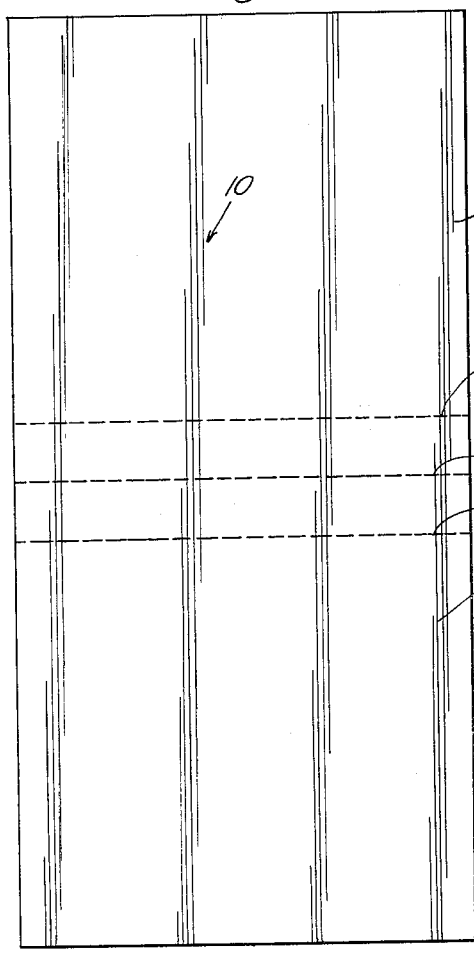
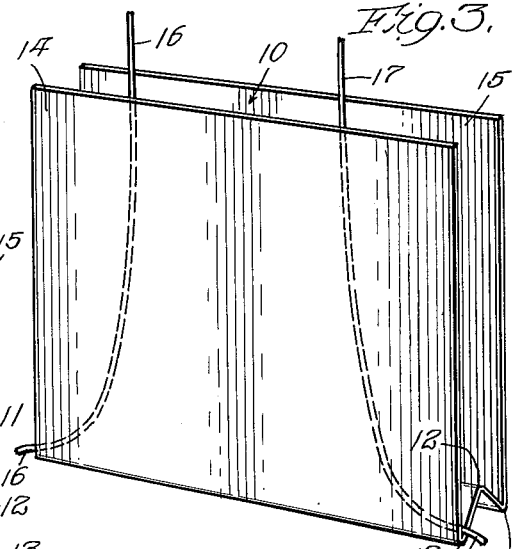
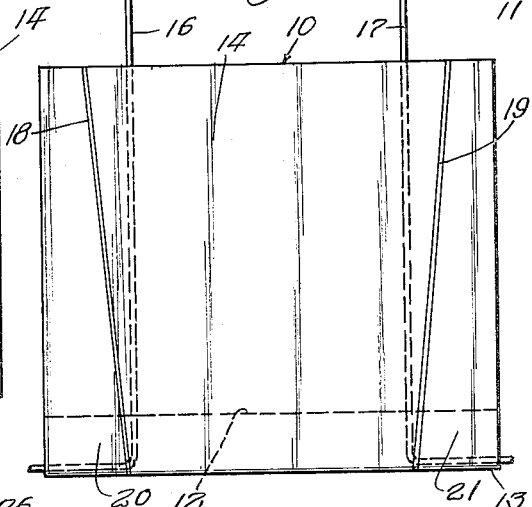
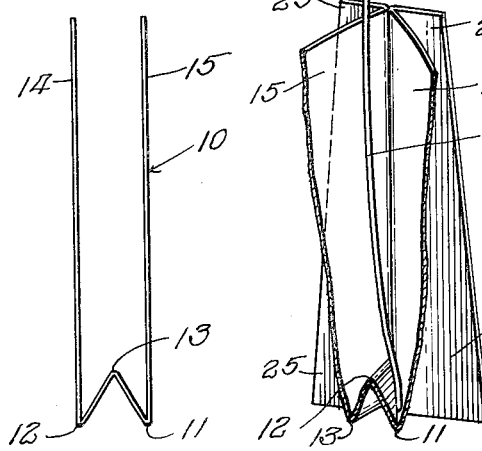
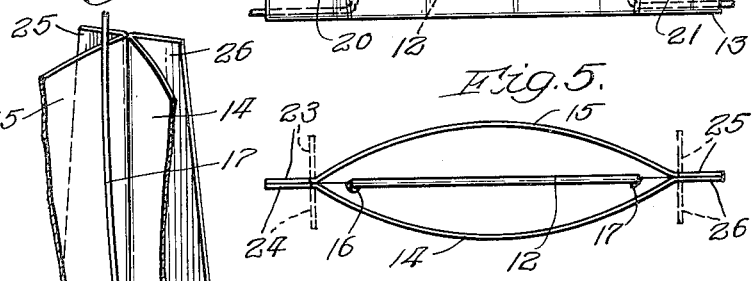
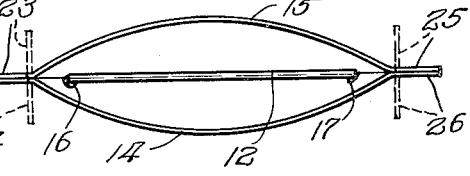
Inventor:
Ralph H. Schulz,
By Merriam, Lorch
and Smith, Attys

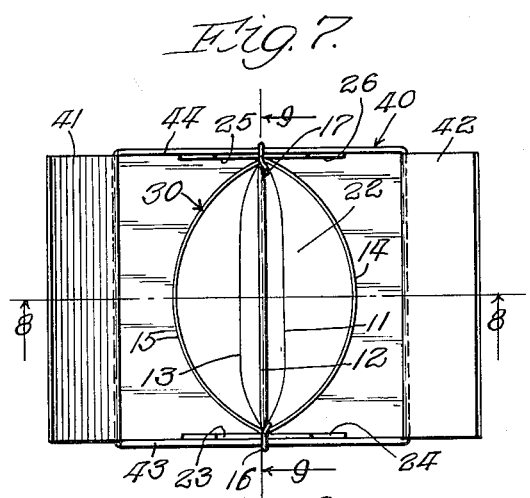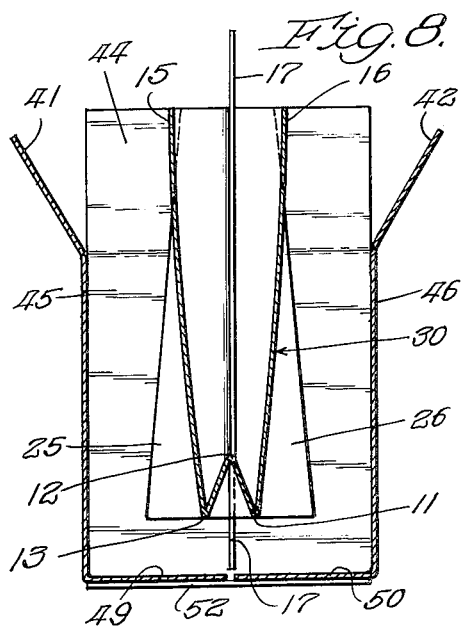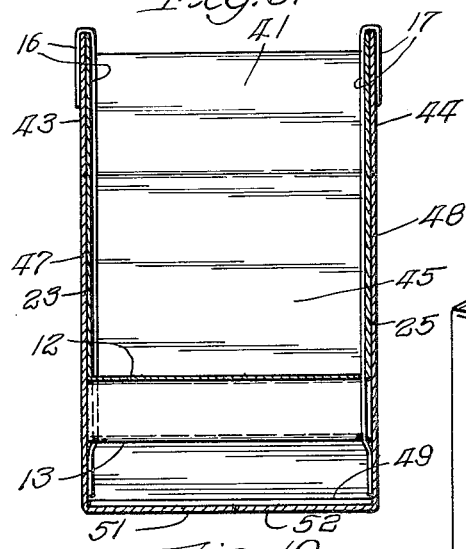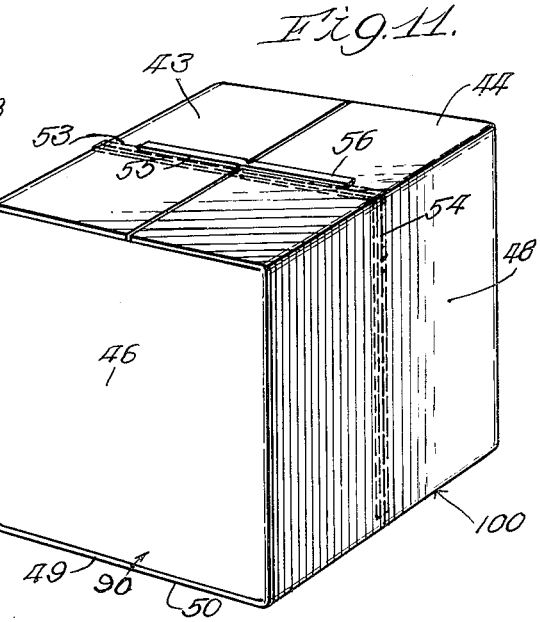

United States Patent Office 2,985,287
Patented May 23, 1961

2,985,287
RUPTURABLE PACKAGES AND COMPONENTS THEREOF

Ralph H. Schulz, Milwaukee, Wis., assignor, by mesne assignments, to Freeman Chemical Corporation, a corporation of Delaware Filed Feb. 14, 1958, Ser. No. 715,341

8 Claims. (Cl. 206—46)

This invention relates to rupturable packages, components thereof, and the method of forming said packages.

My invention provides for packaging frangible or readily damaged articles in a rupturable container which encases a sheath of low density, shock absorbing cellular plastic material which, in turn, has the article embedded therein, thereby maintaining said article in cushioned relation to the container. Furthermore, the containers used in forming my packages have a rip-strip that may be pulled, thereby rupturing or tearing the container and providing ready access to the embedded article. Still further, my invention contemplates the use of a protective envelope which supports and suspends the article to be packaged in spaced relation to at least one side (e.g., bottom) of the container while the cellular plastic sheath is being formed from a liquid foamable mix. The envelope serves as an impervious barrier which protects the article from the liquid foamable mix that is poured into the container around the outside of the envelope, and supports the article free of at least one side of the container so that the cellular sheath will more effectively cushion the article from impacts directed to the outer surface of the container.

The packaging industry has long sought to discover a method of packaging articles with a cellular plastic that (1) may be foamed-in-place at room temperatures and atmospheric pressures, (2) is resilient as well as flexible, (3) is characterized by high hysteresis as evidenced by its slow return, after impact, to its normal unflexed dimensions, thus indicating that a high level of energy is absorbed by the cellular material, (4) possesses low compression set and retains a high proportion of its initial resiliency after being subjected to repeated compression or compressed by loads which exceed its load limit, (5) has a low density, and (6) is rupturable (e.g., low tensile strength). Cellular polyurethane having a low density (i.e., not more than 20 pounds/ft.$^3$) possesses all of these characteristics and is significantly superior, for most purposes, to other conventional cellular plastic materials.

Among the advantages that result from the use of cellular polyurethane, as compared to other cellular packaging products, are the following: no heat or special pressure conditions are required to induce the formation of the foaming reaction; the liquid, foamable polymeric-isocyanate mix may be foamed-in-place in a short period of time with simple equipment; cellular polyurethane is capable of withstanding deterioration by solvents, oils, and greases, especially as compared to cellular styrene; cellular polyurethane is resistant to vermin, fungi, and insects, especially as compared to paper, cloth, wood, felt, and the like; it adheres to non-waxy or non-greasy surfaces when foamed-in-place, thus enhancing the structural strength of the package; it may be formed with low density as well as low tensile strength properties, especially as compared to cellular vinyl, rubber, and phenolic products; cellular polyurethane is not excessively expensive; it is flame retardant, especially as compared with cellular polystyrene; it is not subject to deterioration at temperatures encountered in storage and, in this respect, is much superior to cellular styrene and vinyl products; it has good thermal insulating properties; it has good shock absorption properties, especially as compared to cellular vinyl, rubber and styrene products; and cellular polyurethane has readily adjustable tensile strength, tear-resistance, and density characteristics. Thus, cellular polyurethane is capable of meeting standards which are much too demanding for cellular resins such as exemplified by the comparatively rigid cellular phenol, vinyl, and styrene products.

I have discovered that frangible or readily damaged articles may be effectively protected and stored in rupturable packages, which comprise: a rupturable container; a low density, shock absorbing, cellular plastic sheath encased therein, said sheath having a density of not more than 20 pounds/ft.$^3$; a protective envelope embedded in said sheath and suspendably secured to said container independent of said sheath, said envelope having an upper opening adjacent the top of the container extending free of said sheath; and an article encapsulated in said envelope and held in cushioned relation to said container by said sheath.

The best results are obtained when the sheath is made of cellular polyurethane. These packages may be made by a process which comprises: placing the article to be packaged in a protective envelope or capsule which is suspendably secured to a container in spaced relation to at least one of the walls of said container; placing an unoriented interlacement of fibers in the container around the supported, encapsulated article; introducing a liquid, foamable polymeric-isocyanate mix having activated silica dispersed therein into the container but outside of the envelope; and permitting the mix to embed the encased and suspended article with shock absorbing, low density, solid cellular polyurethane. The use of an unoriented interlacement of fibers and activated silica is not essential in the packaging of most articles.

The container may be closed or sealed by the use of glue, adhesive tape, staples, and the like either immediately after pouring the liquid polymeric-isocyanate mix into the container or after the formation of the solid cellular polyurethane. In any event, the foaming rate of the liquid mix is sufficiently rapid so that the container and its contents may be handled in a few minutes.

The protective envelope prevents the liquid mix from directly contacting the article being packaged during the foaming operation and serves to support the article above the bottom of the container during the formation of cellular polyurethane from the liquid mix. However, when foaming is completed, the article is essentially or entirely supported by cellular polyurethane.

When an unoriented interlacement of fibers is used, the cellular polyurethane will lock the fibers within its structure, and the resulting cellular product will possess greater improved compression resistance and substantially improved resistance to compression set. The fiber-reinforced cellular polyurethane is capable of carrying a comparatively greater load for a given thickness of cellular material and is able to resist the continual compression load of heavy objects over a long period of time without establishing a compression set which is permanent and, hence, a loss in cushioning properties.

When dehydrated silica gel is incorporated into the liquid polymeric-isocyanate mix, the resulting cellular polyurethane will have activated silica dispersed therein which exhibits a dehydrating influence on air. It is certainly unexpected that activated silica could be incorporated into cellular polyurethane because the presence of water, such as may be present in the liquid, foamable polymeric-isocyanate mix, normally deactivates activated silica. Activated silica may be formed by dehydrating silica gel at about 350°–400° F.

The activated silica may be added with the isocyanate component to the polymeric material so as to delay contacting the activated silica with water until occurrence of the foam-forming reaction. The amount of activated silica that may be incorporated into the liquid polymeric-isocyanate mix is generally a matter of choice. However, effective mixing of the polymeric and polyisocyanate components will not be accomplished when excessive levels of activated silica are used. Excellent cellular polyurethane may be produced when 25% by weight of the cellular polyurethane is activated silica.

It is essential that the cellular polyurethane used in forming my package have a density of not more than 20 pounds/ft.$^3$, preferably not more than about 3.5 pounds/ft.$^3$. When a readily rupturable cellular plastic is desired, the tensile strength of cellular material should not exceed about 30 p.s.i. and should, preferably, be not more than about 5 p.s.i.

Cellular polyurethane may be produced by reacting an alkyd resin component containing an alkyd resin (e.g., condensation product of polyhydric alcohol and polycarboxylic acid), water, catalyst, and preferably, an emulsifier with a polyisocyanate component. Cellular polyurethane may also be produced by reacting an alkyd resin with a sufficient amount of polyisocyanate so as to make a prepolymer containing unreacted NCO groups; the prepolymer may then be reacted with water or a water-catalyst mix to produce a cellular reaction product. Insoluble, inert additives such as hydrated silica pigment or ferric oxide may be incorporated into the polymeric-isocyanate mix in order to produce polyurethane foams having uniform cells of the desired size. The liquid, foamable polymeric-isocyanate mix may be formed in and ejected from a mixing device such as described in Freeman and Frentzel application Serial No. 585,509, filed May 17, 1956, now abandoned.

The alkyd resin may be the reaction product of a polyhydric alcohol and polybasic acid unmodified or modified with oil and/or other resins, and the like. For example, a suitable alkyd resin may be produced by reacting saturated acids such as adipic acid with diethylene glycol and trimethylol ethane. Unsaturated dibasic acids could be wholly or partially substituted for the saturated acid, but tend to produce a polyurethane foam that possesses comparatively less durability on aging.

The polymeric material may also contain or consist of a polyether or a natural polyester such as castor oil. In using the polyether, a prepolymer of the polyether and isocyanate should be used.

Conventional polyisocyanates, such as toluene diisocyanate, which are used in the production of light, rupturable cellular polyurethane may be used in forming the cellular polyurethane sheath.

The following examples illustrate suitable liquid, foamable polymeric-isocyanate mixes which may be used in forming the cellular polyurethane sheath that is used to cushion the packaged article from impacts:

*Example I*

A polymeric admixture may be prepared by admixing 65.15 parts by weight Chempol FR–1107 (adipic acid-diethylene glycol-trimethylol ethane reaction product produced by Freeman Chemical Corporation, Port Washington, Wisconsin), 1.87 parts by weight of N-methyl morpholine, 0.08 part by weight pine oil, 1.52 parts by weight Witco 77–86 (emulsifying agent), 0.42 part by weight Cab-O-Sil (finely divided silica) and 6.46 parts by weight water.

24.50 parts by weight of toluene diisocyanate (80%, 2,4 isomer, 20% 2,6 isomer) should be added to the polymeric admixture. Foaming proceeds in a few seconds. The resulting readily rupturable, low density, flexible, resilient shock absorbing cellular polyurethane has a density of about 1.4–1.5 pounds/ft.$^3$ and tensile strength of less than about 5 p.s.i.

*Example II*

Readily rupturable, low density, flexible, resilient, shock absorbing cellular polyurethane having a density of about 3.5–20 pounds/ft.$^3$ and tensile strength of about 25–30 p.s.i. may be prepared by mixing 24.95 parts by weight toluene diisocyanate with a polymeric admixture of 71.2 parts by weight Chempol FR–1107, 0.89 part by weight Pluronic L–61 and 0.35 part by weight Pluronic L–62 (condensates of ethylene oxide with a hydrophobic base formed by condensing propylene oxide with propylene glycol, produced by Wyandotte Chemicals Corp.), 2.14 parts by weight water, and 0.47 part by weight N-methyl morpholine.

If desired, phenolic plastic material (e.g., reaction product of phenol and formaldehyde and barium hydroxide) may be used to form a sheath of cellular phenolic plastic (see U.S. Patent 2,780,350).

In the accompanying diagrammatic drawings:

Figure 1 is a plan view of a flexible, transparent polyethylene blank which may be used to form a protective envelope;

Figure 2 is a right side elevational view of the blank of Figure 1 after said blank is folded to form a bottom gusset having parallel fold lines;

Figure 3 is a perspective view showing the first step in positioning the rip-strips along each of the ends of the folded blank of Figure 2;

Figure 4 is a front elevational view of the folded structure of Figure 3 after (1) the lower end of each of the rip-strips is positioned along one of the two lowermost folds of the gusset and extended upwardly above the structure in an L configuration, and (2) the front and back flaps and gusset are sealed together at each of their ends along substantially vertical seal lines which converge towards the gusset;

Figure 5 is a plan view of the completed envelope showing by interrupted lines, the positions to which the tabs may be folded to form wings;

Figure 6 is a vertical sectional view showing, in prespective, the structure of one of the ends of the envelope of Figure 5 when adjacent tabs are folded to the positions shown by the interrupted lines in Figure 5;

Figure 7 is a plan view of the container of Figure 8 showing the upper flaps thereof in upwardly extending, open positions, and the completed envelope of Figure 5 affixed to opposite internal sides of the container by securing the folded tabs thereto;

Figure 8 is a front vertical sectional view of the structure of Figure 7 taken along the line 8—8 thereof, which shows a rip-strip (1) extending beyond the free edge of a top flap, and (2) secured to an adjoining side wall of the container along a line extending from the bottom of the envelope to a point contiguous to the bottom of the container;

Figure 9 is a side vertical sectional view of the structure of Figure 7 taken along the line 9—9 thereof, which shows the upper ends of the rip-strips folded over the free ends of upper opposed flaps and secured to the outer surfaces thereof;

Figure 10 is a front vertical sectional view, similar to Figure 8, of a completed package comprising an article encased in the protective envelope which, in turn, is secured to opposed internal sides of the container, and a sheath of cellular polyurethane (formed from the liquid mix) surrounding said article; and Figure 11 is a perspective view of a second completed package having a container with a second type of rip-strips secured thereto along score lines.

Referring now to the drawings more in detail wherein like numerals are employed to designate similar structure throughout the various figures, it will be seen that Figure 1 shows a flexible, transparent polyethylene blank 10 which is used to form a protective envelope 30. In constructing the envelope, the blank 10 is first folded downwardly along fold line 12. Reverse folds are then made along fold lines 11 and 13, as shown in Figures 2 and 3, to form a lower expandable gusset that connects front and rear flaps 14 and 15, respectively, of the blank.

Figure 3 is a perspective view showing the first step in positioning rip-strips 16 and 17 along each of the ends of the folded blank shown in Figure 2. In completing the positioning of the rip-strips in the folded blank, intermediate segments of the elongated, flexible rip-strips 16 and 17 are positioned along the ends of the fold line 13 of the gusset and extended in an upward direction to form the back-to-back L configuration shown in Figure 4. If desired, the rip-strip may be positioned along the end of fold line 11 as shown in Figure 6. The front and back flaps 14 and 15, respectively, and intermediate gusset are heat sealed along converging, substantially vertical seal lines 18 and 19.

The rip-strips 16 and 17 shown in Figures 7–10 consist of predetermined lengths of ordinary string; if desired, other flexible material may be used.

Each of the fold lines 11 and 13 of the gusset is then cut from their respective outer, free ends to a point contiguous to the outer edge of the adjacent seal line, thereby forming four slits extending from the outer ends of the envelope just to seal lines 18 and 19. As shown in Figure 4, the portions of the gusset which extend outwardly beyond the seal lines 18 and 19 form inverted V-shaped tabs 20 and 21, respectively. The tabs 20 and 21 are cut and removed, thereby forming an envelope 30 having an opening 22 at its upper end only. The substantially vertically extending tabs 23, 24, 25, and 26, which extend laterally or outwardly beyond the seal lines 18 and 19 to the ends of the envelope 30, are then folded back 90° along seal lines 18 and 19 to form wings. The interrupted lines in Figure 5 show these tabs in their folded positions. Figure 6 shows the structure of one of the ends of the envelope 30 after the tabs are folded.

The envelope 30 is now ready to be installed in the container 40 shown in Figures 7–10.

Bottom edges 11 and 13 of envelope 30 extend between seal lines 18 and 19. These edges should be equal to or slightly greater than the distance between the opposed internal sides of the container to which the tabs 23, 24, 25, and 26 are to be secured. By securing the folded tabs or wings to opposed internal sides of the container with the gusset spaced above the bottom thereof, the envelope 30 will be held in a suspended position. The downwardly converging seal lines 18 and 19 provide the envelope 30 with a large upper opening 22 through which the article being packaged may be inserted into the envelope.

The corrugated cardboard container 40 shown in Figures 7–10 and container 90 of Figure 11 may be made from a single cardboard blank. Spiess Patent 2,637,251 discloses apparatus which may be used to form blanks from which such containers may be made. If desired, the container may be made of cellulosic material such as paper, cardboard, and fiberboard, as well as other suitable materials. When the internal surfaces of the container are non-waxy or non-greasy, the cellular polyurethane will adhere to the container thereby enhancing the structural strength of the completed package.

The container 40 shown in Figures 7–10 has upper flaps 41, 42, 43, and 44, which are secured, at their respective fold lines, to side walls 45, 46, 47, and 48. The bottom flaps 49, 50, 51, and 52 are secured, at their respective fold lines, to side walls 45, 46, 47, and 48. Figures 7–10 show the bottom flaps 49, 50, 51, and 52 in their normal closed or sealed positions, and the upper flaps 41, 42, 43, and 44 in their extended, open positions.

The envelope 30 is positioned in the container 40 in the manner shown in Figures 7 and 8 with the closed bottom of the envelope 30 spaced above the bottom of the container. The opening 22 of the envelope extends above the fold lines of the upper flaps 43 and 44 of the container, thereby protecting the packaged article from the liquid reaction mixture and enabling displaced air to escape from the envelope free of the liquid mix. As shown in Figures 8 and 9, the folded tabs or wings 23, 24, 25, and 26 are then affixed to the sides 47 and 48 and their respective adjoining flaps 43 and 44 of the container 40 with securing means such as glue and the like. If desired, these folded tabs may be secured to the container with staples, adhesive tape, or other suitable securing means. When adhesive tape is used, it is desirable to perforate the tabs so as to provide a greater adhering surface.

The lower end of the rip-strip 17 that extends below the envelope 30 is then glued to the side 48 of the container as shown in Figure 8. The upper end of the rip-strip 17 is shown in Figure 9 folded back over the upper flap 44 and secured thereto with glue or the like. The rip-strip 16 is glued to the side 47 and adjoining upper flap 43 in a similar manner. If desired, the rip-strip may be secured to the container with adhesive tape or the like. The upper exposed segments of rip-strips 16 and 17 may be freed from their respective flaps 43 and 44 by merely pulling their free ends away from the container 40 towards the abutting free ends of the flaps.

The article to be packaged may then be inserted into the envelope 30 through the opening 22 so that the top of the article extends below the fold lines of the upper flaps 41, 42, 43, and 44. The suspended envelope 30 thus supports the article in the container 40 above the sealed bottom of the container and later enables the cellular polyurethane to cushion the bottom as well as other sides of the article.

A predetermined amount of liquid, foamable polymeric-isocyanate mix is then poured into the container 40 around the outside of the envelope. This step of pouring the liquid polymeric-isocyanate mix into the container is disclosed in Freeman application Serial No. 634,280, filed January 15, 1957, now Patent No. 2,895,603. Allowance should be made for the increase in volume (i.e., about 20–30 fold) of the foamable mix during the formation of cellular polyurethane. The upper flaps 41, 42, 43, and 44 of the container are promptly closed and sealed (sealing may be effected by using staples, adhesive tape, glue, etc.) by first closing flaps 41 and 42; alternatively, they may be closed and sealed after completion of foaming (i.e., production of cellular polyurethane). The liquid mix will rise in the container around the suspended article as the cellular polyurethane is formed therefrom. The air that is present in the envelope at the start of foaming will be displaced during foaming with cellular polyurethane and expelled through the top of the envelope 30 free of the reaction mixture as the cellular polyurethane is molded to the general contour of the article being packaged. The envelope thus protects the article from being damaged by contact with the liquid mix and enables the article to be more effectively cushioned with cellular polyurethane by permitting the polyurethane to absorb impacts or shocks directed to the bottom of the container, as well as other sides thereof. The entire foaming operation may be effected in about one minute.

Figure 10 shows a completed package 80 comprising a container 40 having a protective envelope 30 suspended therein, an article 60 encased in said envelope, and a sheath 70 of rupturable, low density, flexible, resilient, shock absorbing cellular polyurethane which maintains said article in cushioned relation to the container.

The completed package 80 of Figure 10 may be opened by pulling the upper segments of the rip-strips 16 and 17 free of flaps 43 and 44, respectively, and pulling the freed segments across flaps 43 and 44 of the container and down opposed sides 47 and 48 thereof, thereby rupturing or cutting three interconnecting surfaces (i.e., 43, 44, 47 and 48) of the container as well as seal lines 18 and 19 of the envelope 30. The paths of rupturing are defined by the positions of rip-strips 16 and 17 against the inside of container 40. After the container 40 is ruptured, the article 60 may be removed from the envelope 30 and cellular sheath. If desired, the sheath may be readily ruptured with the hands so as to permit the article to be withdrawn from its embedded position in the sheath. The article may later be reinserted into the envelope, the ruptured polyurethane and container replaced in their original positions and the abutting edges (i.e., lines of rupture) of the container secured together with adhesive tape or the like. The packaged article is, thus, again cushioned against damaging shocks or impacts.

Figure 11 shows a completed package 100 somewhat similar to package 80. However, each of the rip-strips 55 and 56 is made of nylon fibers or threads sandwiched between two strips of paper which are bonded to each other. The container 90 shown in Figure 11 differs from the container 40 shown in Figure 4 in that the former has score lines 53 and 54 along the paths defined by rip-strips 55 and 56. The score lines 53 and 54 facilitate the rupturing of container 90, after which the cellular sheath may be ruptured, if desired, with the hands to provide easy access to the packaged article.

The rip-strips used in my package may consist of ordinary string, wire (e.g., wire coated with plastic), paper strips, fabric strips, or other suitable means for cutting the container. Furthermore, if desired, the rip-strips may terminate at the opposed abutting edges of the upper flaps 43 and 44 and extend, at their lower ends, about an inch or more through the sides 47 and 48 of the container adjacent or near the bottom thereof; the container may then be ruptured by pulling these outside, free ends towards the top of the package and across the adjoining upper flaps.

The foregoing detailed description has been given for clearness of understanding only, and no unncessary limitations should be understood therefrom, as modifications will be obvious to those skilled in the art.

I claim:

1. A rupturable package for frangible or readily damaged articles, which comprises: a rupturable container having connecting sides, top, and bottom, said container having at least one rip-strip secured thereto extending across the top and along opposed sides of said container in a substantially continuous line; a solid low density, shock absorbing, cellular plastic sheath encased therein, said sheath having a density of not more than 20 pounds/ft.$^3$; a protective envelope comprising opposed front and rear flaps connected by a bottom wall, said envelope being embedded in said sheath and suspendably secured coextensive with at least part of said rip-strip, at the opposed ends of said flaps, to said opposed sides of the container, said coextensive rip-strip and securement of said envelope to said opposed sides being positioned so that said rip-strip is positioned between said front and rear flaps of said envelope whereby the rupturing of said opposed sides of said container opens said opposed ends of said envelope and provides ready access to the contents of said envelope, said envelope having a filling opening positioned not below the top of said sheath and adjacent to the top of the container; and an article encapsulated in said envelope and held in cushioned relation to said sides, top and bottom of the container by said sheath, ready access to said packaged article being initiated by pulling said rip-strip, thereby rupturing the container.

2. A rupturable package for frangible or readily damaged articles, which comprises: a rupturable container having connecting sides, top, and bottom, said container having at least one rip-strip secured thereto extending across the top and along opposed sides of said container in a substantially continuous line; a solid low density, shock absorbing, cellular plastic sheath encased therein, said sheath having a density of not more than 20 pounds/ft.$^3$; a protective envelope comprising opposed front and rear flaps connected by a bottom wall, said envelope being embedded in said sheath and suspendably secured coextensive with at least part of said rip-strip, at the opposed ends of said flaps, to said opposed sides of the container, said coextensive rip-strip and securement of said envelope to said opposed sides being positioned so that said rip-strip is positioned between said front and rear flaps of said envelope whereby the rupturing of said opposed sides of said container opens said opposed ends of said envelope and provides ready access to the contents of said envelope; and an article encapsulated in said envelope and held in cushioned relation to said sides, top and bottom of the container by said sheath, ready access to said packaged article being initiated by pulling said rip-strip, thereby rupturing the container.

3. A rupturable package for frangible or readily damaged articles comprising: a container having connecting sides and top and bottom ends; said container having a rip-strip defining a continuous intermediate line of rupture extending across an end of the container and along opposed sides thereof; said rip-strip facilitating the severing of container along said line; a solid, low density, cellular plastic sheath being encased within said container in shock absorbing relation thereto and having a density of not more than 20 pounds/ft.$^3$; a flexible, protective envelope being embedded in said sheath and having a top feeding opening; said envelope being suspendably secured to said opposed sides of the container along said line of rupture, and extending at least to and across the top of the sheath as well as to and across said end of the container, thereby partitioning the sheath; an article in said envelope held in cushioned relation to said container by said sheath; ready access to said packaged article being acquired by pulling said rip-strip thereby severing said container, and separating the severed container and partitioned sheath from the envelope.

4. The package of claim 3 wherein the rip-strip comprises flexible stitching having an accessible free pulling end for severing said container, and said stitching secures the envelope to said opposed sides.

5. The package of claim 3 wherein said sheath is cellular polyurethane.

6. The package of claim 3 wherein the rip-strip extends across only one end of said container and along said opposed sides, thereby establishing the other end of the container as a hinge whereby the severed portions of the container may be pivoted into end-to-end position.

7. A rupturable package for frangible or readily damaged articles comprising: a container having connecting sides and top and bottom ends; said container having a rip-strip defining a continuous intermediate line of rupture extending across one end only of the container and along opposed sides thereof; said rip-strip facilitating the severing of the container along said line and said other end of the container serving as a hinge, whereby the severed portions of the container may be pivoted into end-to-end position; a solid, low density, cellular plastic sheath being encased within said container in shock absorbing relation thereto and having a density of not more than 20 pounds/ft.$^3$; a flexible, protective envelope being embedded in said sheath and having a top feeding opening; said envelope being suspendably secured to said opposed sides of the container along said line of rupture, and extending at least to and across the top of the sheath as well as to and across said one end of the container, thereby partitioning the sheath, whereby the partitioned portions of the sheath may be pivoted into end-to-end position with the severed portions of the container; an article in said envelope held in cushioned relation to said container by said sheath; ready access to said packaged article being acquired by pulling said rip-strip thereby severing said container, and separating the severed portions of the container and partitioned sheath from the envelope by pivotally moving them into end-to-end position.

8. The package of claim 7 wherein said sheath is cellular polyurethane.

References Cited in the file of this patent

UNITED STATES PATENTS

| | | |
|---|---|---|
| 985,850 | Smith | Mar. 7, 1911 |
| 1,080,190 | Bauer | Dec. 2, 1913 |
| 2,177,919 | Vogt | Oct. 31, 1939 |
| 2,305,349 | Goodwin | Dec. 15, 1942 |
| 2,355,073 | Hothersall | Aug. 8, 1944 |
| 2,771,184 | Ryno et al. | Nov. 20, 1956 |
| 2,780,350 | Simon et al. | Feb. 5, 1957 |
| 2,833,398 | Marshall | May 6, 1958 |
| 2,837,208 | Lingenfelter | June 3, 1958 |
| 2,895,603 | Freeman | July 21, 1959 |

FOREIGN PATENTS

| | | |
|---|---|---|
| 1,012,864 | Germany | July 25, 1957 |

UNITED STATES PATENT OFFICE

CERTIFICATE OF CORRECTION

Patent No. 2,985,287　　　　　　　　　　　　　　　May 23, 1961

Ralph H. Schulz

It is hereby certified that error appears in the above numbered patent requiring correction and that the said Letters Patent should read as corrected below.

In the drawings, Sheet 1, Fig. 2, for the reference numeral "13" read -- 12 --; same Fig. 2, for the reference numeral "12" read -- 13 --; Sheet 2, Fig. 8, for the reference numeral "16" read -- 15 --; same Fig. 8, for the reference numeral "15" read -- 14 --; column 4, lines 41 and 42, for "prespective" read -- perspective --; column 7, line 20, for "Figure 4" read -- Figures 7-10 --.

Signed and sealed this 10th day of October 1961.

(SEAL)
Attest:

ERNEST W. SWIDER
Attesting Officer

DAVID L. LADD
Commissioner of Patents

USCOMM-DC